US009736160B2

United States Patent
Adam et al.

(10) Patent No.: US 9,736,160 B2
(45) Date of Patent: Aug. 15, 2017

(54) PROTECTED GRAPHICAL USER INTERFACE FOR ROLE-BASED APPLICATION AND DATA ACCESS

(71) Applicant: International Business Machines Corporation, Armonk, NY (US)

(72) Inventors: Constantin M. Adam, Norwalk, CT (US); Shang Q. Guo, Cortland Manor, NY (US); John J. Rofrano, Mahopac, NY (US); Yaoping Ruan, White Plains, NY (US); Frederick Yung-Fung Wu, Greenwich, CT (US); Sai Zeng, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 277 days.

(21) Appl. No.: 14/447,891

(22) Filed: Jul. 31, 2014

(65) Prior Publication Data

US 2016/0036817 A1     Feb. 4, 2016

(51) Int. Cl.
*G06F 3/0484*     (2013.01)
*H04L 29/06*     (2006.01)
*G06F 3/0481*     (2013.01)

(52) U.S. Cl.
CPC ............ *H04L 63/10* (2013.01); *G06F 3/0484* (2013.01); *G06F 3/04817* (2013.01); *H04L 63/104* (2013.01); *G05B 2219/23247* (2013.01)

(58) Field of Classification Search
CPC ..... H04L 63/10; H04L 63/104; G06F 3/0484; G06F 3/04817; G05B 2219/23247
See application file for complete search history.

(56) References Cited

U.S. PATENT DOCUMENTS

| | | | |
|---|---|---|---|
| 6,377,281 B1 * | 4/2002 | Rosenbluth | A63J 19/00 345/473 |
| 9,417,888 B2 * | 8/2016 | Forstall | |
| 2002/0165739 A1 * | 11/2002 | Guyan | G06Q 40/08 705/4 |
| 2003/0023473 A1 * | 1/2003 | Guyan | G06Q 10/06311 705/4 |
| 2003/0061482 A1 * | 3/2003 | Emmerichs | G06F 21/604 713/165 |

(Continued)

*Primary Examiner* — Shen Shiau
(74) *Attorney, Agent, or Firm* — Ryan, Mason & Lewis, LLP

(57) ABSTRACT

Methods, systems, and computer program products for a protected graphical user interface for role-based application and data access are provided herein. A method for controlling access on an endpoint device to at least a portion of an application includes obtaining a default configuration indicating whether one or more widget functions associated with the application are enabled in a graphical user interface; modifying one or more of the widget functions in the default configuration to a disabled status in the graphical user interface based on a privilege configuration; determining if one or more user click events generated using the graphical user interface are associated with a widget function having the disabled status; and preventing the user click events having the disabled status from being provided to an operating system for further processing, wherein at least one of the steps is carried out by a computing device.

17 Claims, 4 Drawing Sheets

(56) References Cited

U.S. PATENT DOCUMENTS

| | | | |
|---|---|---|---|
| 2007/0101433 A1* | 5/2007 | Louch | G06F 21/552 |
| | | | 726/25 |
| 2007/0118813 A1* | 5/2007 | Forstall | G06F 3/0486 |
| | | | 715/805 |
| 2009/0327911 A1* | 12/2009 | Ningune | G06F 21/604 |
| | | | 715/744 |
| 2011/0047484 A1* | 2/2011 | Mount | G06Q 10/10 |
| | | | 715/753 |
| 2014/0108936 A1* | 4/2014 | Khosropour | G06F 9/4443 |
| | | | 715/735 |
| 2016/0092180 A1* | 3/2016 | Straub | G06F 9/4443 |
| | | | 715/762 |

\* cited by examiner

PROTECTED GRAPHICAL USER INTERFACE FOR ROLE-BASED APPLICATION AND DATA ACCESS

FIELD OF THE INVENTION

Embodiments of the invention generally relate to information technology, and, more particularly, to techniques for controlling the activities of a system administrator or another user on an endpoint device.

BACKGROUND

System administrators must often log into an endpoint computing device to manage the device. There is currently no control mechanism on a graphical user interface (GUI) of a device, however, that restricts the activities of the system administrator to perform only actions that are appropriate for the current role and tasks of the administrator.

Thus, a need exists for a mechanism to control access on a user interface to applications, or portions thereof, and data in the GUI based on the current privilege configuration. For example, some license models have different prices at different times. Thus, an enterprise may desire to block services at time when a given licensed tool is more expensive.

SUMMARY

In one aspect of the present invention, techniques for a protected graphical user interface for role-based application and data access are provided. An exemplary computer-implemented method for controlling access on an endpoint device to at least a portion of an application can include steps of obtaining a default configuration indicating whether one or more widget functions associated with the application are enabled in a graphical user interface; modifying one or more of the widget functions in the default configuration to a disabled status in the graphical user interface based on a privilege configuration; determining if one or more user click events generated using the graphical user interface are associated with a widget function having the disabled status; and preventing the user click events having the disabled status from being provided to an operating system for further processing, wherein at least one of the steps is carried out by a computing device.

In one exemplary implementation, the privilege configuration comprises one or more of a user profile and a user privilege for a given role. The exemplary privilege configuration maps one or more of widget functions to roles, tasks to roles, widget functions to endpoints and tasks to times-of-day.

According to one aspect of the invention, the widget function having the disabled status has a visual indicator illustrating the disabled status. For example, the visual indicator comprises presenting the widget function having the disabled status with one or more of a predefined color and a semi-transparent display technique. The widget function having the disabled status is optionally disabled for one or more of a period of time, for a particular user, for a particular task, for accessing a particular file and for loading of a particular application.

Another aspect of the invention or elements thereof can be implemented in the form of an article of manufacture tangibly embodying computer readable instructions which, when implemented, cause a computer to carry out a plurality of method steps, as described herein. Furthermore, another aspect of the invention or elements thereof can be implemented in the form of an apparatus including a memory and at least one processor that is coupled to the memory and configured to perform noted method steps. Yet further, another aspect of the invention or elements thereof can be implemented in the form of means for carrying out the method steps described herein, or elements thereof; the means can include hardware module(s) or a combination of hardware and software modules, wherein the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION

Aspects of the present invention provide a protected GUI for application and data access. According to one aspect of the invention, a desktop GUI is provided in conjunction with the original GUI based on a user profile and/or user privilege for a given role, collectively referred to herein as a privilege configuration. In one exemplary implementation, the original GUI is modified based on the privilege configuration to disable unauthorized applications or portions thereof. For example, a system administrator role may be prevented from restarting or rebooting devices. Thus, application functions related to restarting or rebooting will be disabled in the GUI.

As used herein, a "protected GUI" is a modified graphical user interface generated based on the original graphical interface (desktop) based on the privilege configuration to control access to the applications and/or data in the endpoint.

The privilege configuration contains the policy rules that specify what application widgets (e.g., icons or buttons with associated links and/or commands) or functional widgets in the application in the original interface are enabled/disabled at different time periods and for different user roles. The privilege configuration optionally also contains the signatures of these widgets. For example, Optical Character Recognition (OCR) or screen scraping techniques are optionally employed to capture a widget signature.

As discussed further below, if a widget is rendered as "disabled" by an embodiment of the present invention, all event interactions (e.g., mouse or keyboard inputs) related to the widget are blocked to operating system (OS) processing.

Figure 1:
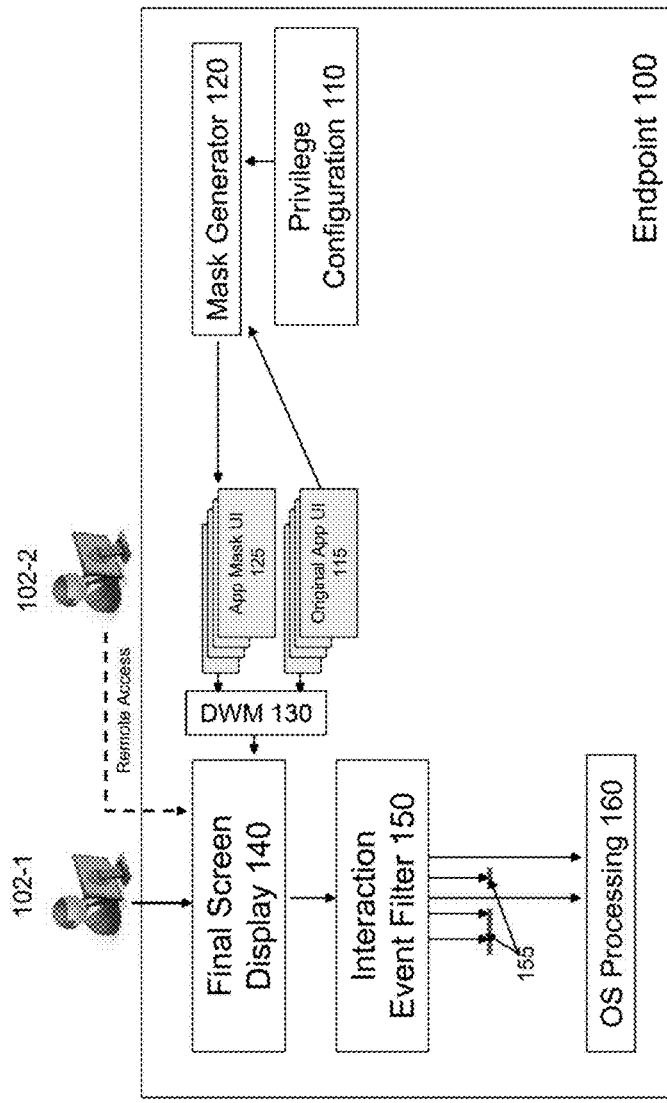
FIG. 1 illustrates an exemplary work flow in an exemplary endpoint 100 in accordance with aspects of the present invention.

FIG. 1 illustrates an exemplary work flow in an exemplary endpoint 100 in accordance with aspects of the present invention. As shown in FIG. 1, the exemplary endpoint 100 comprises a mask generator 120 and an interaction event filter 150. Generally, the mask generator 120 is an additional control layer between a user 102-1, 102-2 and an original GUI 115. When a user clicks on an icon/widget in a GUI, the interaction event filter 150 processes the click event, and if the "click point" associated with the event is pointing to a hidden widget, then the event is suppressed by the interaction event filter 150. The exemplary interaction event filter 150 determines whether or not the click event should be passed to an OS processing layer 160.

As shown in FIG. 1, the mask generator 120 retrieves one or more original application UIs 115 from a graphics buffer, identifies the widgets in each UI 115, compares the widgets in each UI 115 with the privilege configuration and generates one or more mask UIs 125.

The mask generator 120 then renders the mask user interface 125 in the graphics buffer. A Desktop Window Manager (DWM) takes the mask user interface 125 and combines with the original screen 115 to generate a composite final screen 140 for display to one or more users 102-1, 102-2. As discussed further below, any widgets in the final screen 140 that are disabled or inactive can optionally have a visual indicator in the final screen 140 illustrating that the widget is disabled or inactive. For example, a disabled widget can be grayed out or made semi-transparent so that the operator knows which applications or portions of applications are functional and which applications or portions of applications are not functional.

As noted above, when a user clicks on an icon/widget in a GUI, the interaction event filter 150 processes the click event and determines whether or not the click event should be passed to an OS processing layer 160. If a "click point" associated with an event is pointing to a hidden widget, then the event, such as events 155, is suppressed by the exemplary interaction event filter 150. Thus, only those events interacting at an "enabled" area of the final screen 140 pass through to the OS processing layer 160.

The privilege configuration 110 can be created by the Subject Matter Expert (SME) directly in the endpoint 100 or the privilege configuration 110 can be created and distributed by a configuration/policy server 210, as discussed further below in conjunction with FIG. 2. Once the privilege configuration 110 is on the endpoint 100, the protected UI can be implemented on the final display 140.

Figure 2:
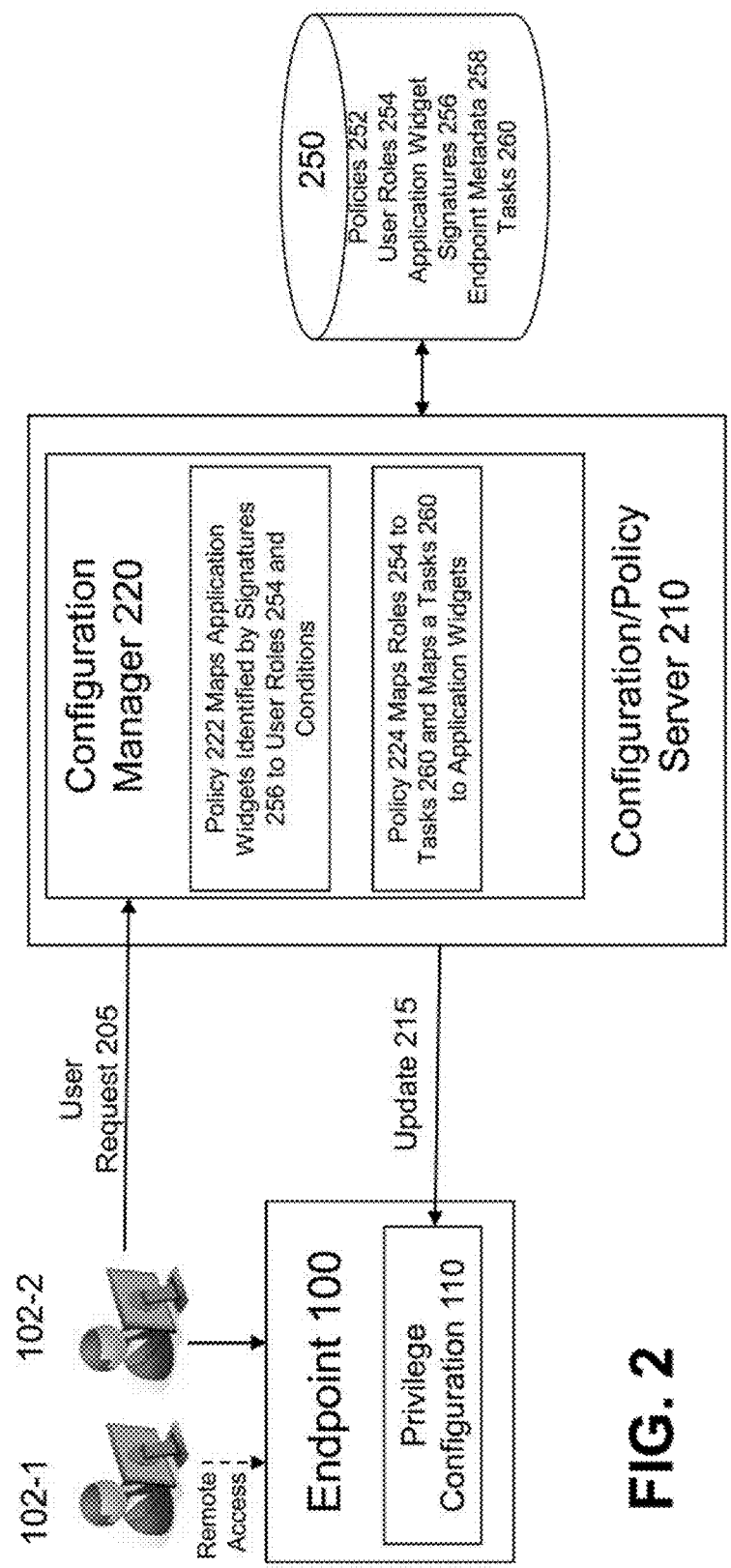
FIG. 2 illustrates an exemplary configuration manager that generates and distributes a privilege configuration to one or more endpoints.

FIG. 2 illustrates an exemplary configuration manager 220 executing on an exemplary configuration/policy server 210 that generates a privilege configuration 110 and distributes the privilege configuration 110 to one or more endpoints 100. As shown in FIG. 2, the exemplary configuration/policy server 210 employs a database 250 that contains policies 252, user roles 254, application widget signatures 256, endpoint metadata 258 and tasks 260. The configuration manager 220 creates a default configuration for each endpoint 100 based on the endpoint metadata 258 and applications installed in the endpoint 100. The default configuration is provided to the endpoint 100.

When a system administrator attempts to access an endpoint 100, the system administrator sends a user request 205 to the configuration/policy server 210. The configuration manager 220 examines the user request 205 and generates a configuration update 215 (delta) based on the task in the request 205. The configuration update 215 (delta) is provided to the endpoint 100.

The configuration manager 220 generates the configuration update 215 based on (i) one or more policies 222 that maps application widgets identified by signatures 256 to user roles 254 and conditions; and/or (ii) one or more policies 224 that map a given role 254 to one or more tasks 260 and map a given task 260 to one or more applications/programs (or widgets) (for example, identified by signatures 256).

In one exemplary implementation, if a user sends a request 205 in a given role 254, the user can access all programs/applications (widgets) for the given role, regardless of the task 260. Thus, the mapping from role to task and task to applications/programs is known when the user identifies the task he will be performed. The system provides the privilege that allows the user to only perform the designated task.

For example, assume that user John is in a db admin role. This role has been defined to perform all db management tasks. If John's task is cleanup db2 files, John can only access certain directories to perform "deletion." John cannot use other applications/programs, such as backup and restore, which are also the job that db admins can do for different tasks.

In some circumstances, the tasks cannot be pre-determined. In this case, when the user (system administrator) logs in, the system lets the user access all applications/tools/programs available for the role. For example, if a database has an issue, the user needs to diagnose and solve the issue. It is hard to know in advance what specific task will be required to solve this issue. Thus, policies 222 map application widgets identified by signatures 256 to user roles 254 and conditions.

Figure 3:
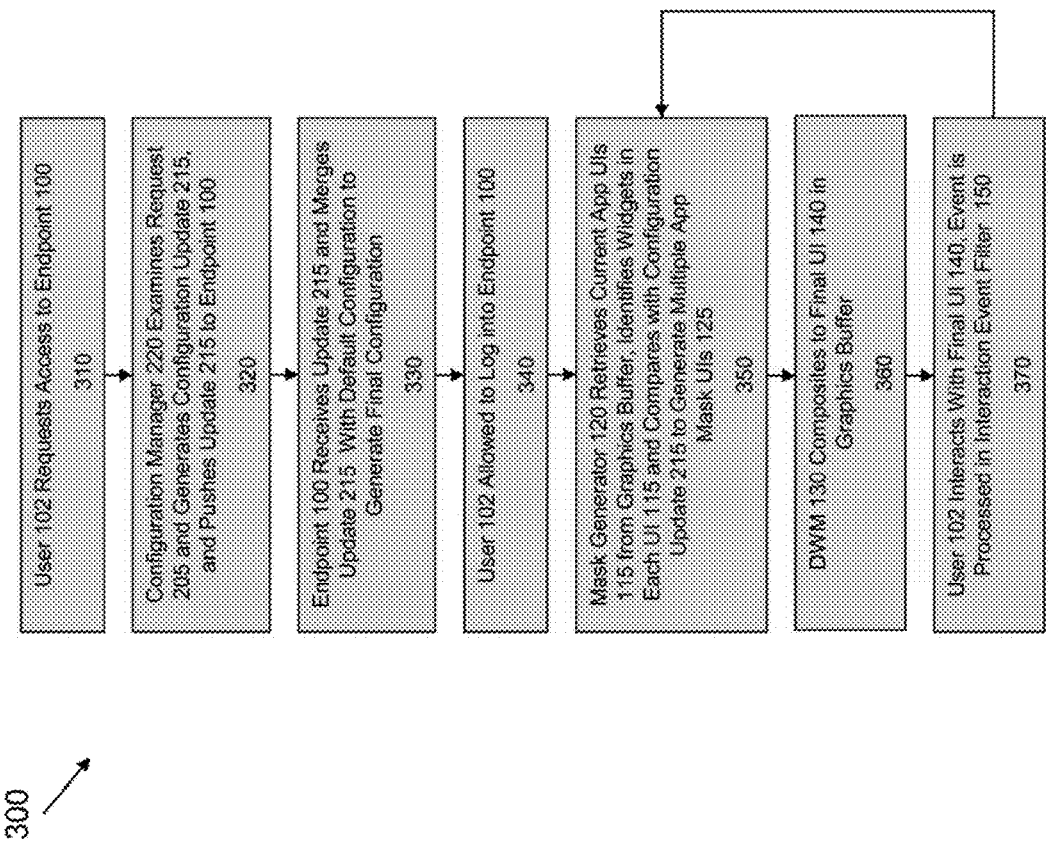
FIG. 3 is a flow chart illustrating an exemplary implementation of a protected GUI process incorporating aspects of the present invention.

FIG. 3 is a flow chart illustrating an exemplary implementation of a protected GUI process 300 incorporating aspects of the present invention. As shown in FIG. 3, a user 102 initially requests access to an endpoint 100 during step 310. The configuration manager 220 then examines the request 205 during step 320 and generates a configuration update 215, as discussed above in conjunction with FIG. 2, and pushes the update 215 to endpoint 100. The endpoint 100 receives the update 215 during step 330 and merges the update 215 with the default configuration to generate the final configuration 140.

During step 340, the user 102 is allowed to log into the endpoint 100. The mask generator 120 retrieves the current application UIs 115 from the graphics buffer during step 350, identifies the widgets in each UI 115 and compares it with the configuration update 215 to generate multiple application mask UIs 125. For each widget (e.g., application window widget or application function widget, such as button, links and menus), the protected GUI system compares the widget with the signatures in the configuration 215 to determine whether or not a given widget is enabled or disabled.

During step 360, the DWM 130 generates composites to the final UI 140 in the graphics buffer. The user 102 then interacts with the final UI 140 during step 370 and the event is processed in the interaction event filter 150 in the manner described above.

Consider an exemplary user "Shang" that sends a request to "cleanup db2 files on endpoint abc" to the configuration/policy server 210. The configuration manager 220 evaluates the role of user "Shang" to determine if this role is authorized to perform the indicated task "cleanup db2 files". The configuration manager 220 also determines if the database db2 is on endpoint device abc. If the database db2 is on endpoint device abc, then the process continues. If the database db2 is not on endpoint device abc, then the request is rejected.

If the database db2 is on endpoint device abc, the configuration manager 220 determines the application/program (or widgets) that will be used to perform the indicated task.

Thereafter, the configuration update 215 is generated based on the request for the user "Shang" and sends the update 215 to the endpoint device abc (during step 320). Thus, a policy can be employed to map a given role to one or more tasks and to map a given task to one or more applications/programs (or widgets).

The techniques depicted in FIG. 3 can also, as described herein, include providing a system, wherein the system includes distinct software modules, each of the distinct software modules being embodied on a tangible computer-readable recordable storage medium. All of the modules (or any subset thereof) can be on the same medium, or each can be on a different medium, for example. The modules can include any or all of the components shown in the figures and/or described herein. In an aspect of the invention, the modules can run, for example, on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 3 can be implemented via a computer program product that can include computer useable program code that is stored in a computer readable storage medium in a data processing system, and wherein the computer useable program code was downloaded over a network from a remote data processing system. Also, in an aspect of the invention, the computer program product can include computer useable program code that is stored in a computer readable storage medium in a server data processing system, and wherein the computer useable program code is downloaded over a network to a remote data processing system for use in a computer readable storage medium with the remote system.

An aspect of the invention or elements thereof can be implemented in the form of an apparatus including a memory and at least one processor that is coupled to the memory and configured to perform exemplary method steps.

Figure 4:
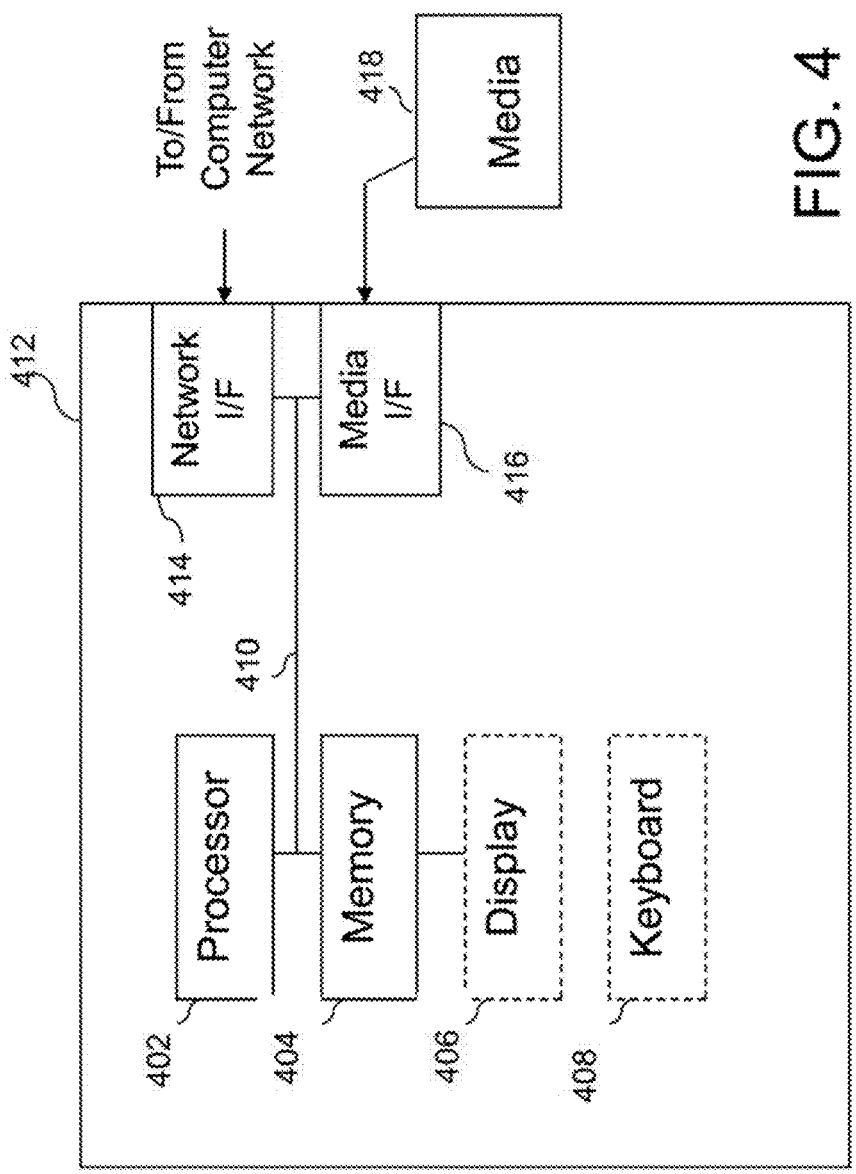
FIG. 4 is a system diagram of an exemplary computer system on which at least one embodiment of the invention can be implemented.

Additionally, an aspect of the present invention can make use of software running on a general purpose computer or workstation. With reference to FIG. 4, such an implementation might employ, for example, a processor 402, a memory 404, and an input/output interface formed, for example, by a display 406 and a keyboard 408. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 402, memory 404, and input/output interface such as display 406 and keyboard 408 can be interconnected, for example, via bus 410 as part of a data processing unit 412. Suitable interconnections, for example via bus 410, can also be provided to a network interface 414, such as a network card, which can be provided to interface with a computer network, and to a media interface 416, such as a diskette or CD-ROM drive, which can be provided to interface with media 418.

Accordingly, computer software including instructions or code for performing the methodologies of the invention, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 402 coupled directly or indirectly to memory elements 404 through a system bus 410. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards 408, displays 406, pointing devices, and the like) can be coupled to the system either directly (such as via bus 410) or through intervening I/O controllers (omitted for clarity).

Network adapters such as network interface 414 may also be coupled to the system to enable the data processing system to become coupled to other data processing systems or remote printers or storage devices through intervening private or public networks. Modems, cable modems and Ethernet cards are just a few of the currently available types of network adapters.

As used herein, including the claims, a "server" includes a physical data processing system (for example, system 412 as shown in FIG. 4) running a server program. It will be understood that such a physical server may or may not include a display and keyboard.

As will be appreciated by one skilled in the art, aspects of the present invention may be embodied as a system, method and/or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, as noted herein, aspects of the present invention may take the form of a computer program product that may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (for example, light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may to comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that to each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 402. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof, for example, application specific integrated circuit(s) (ASICS), functional circuitry, an appropriately programmed general purpose digital computer with associated memory, and the like. Given the teachings of the invention provided herein, one of ordinary skill in the related art will be able to contemplate other implementations of the components of the invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of another feature, integer, step, operation, element, component, and/or group thereof.

The corresponding structures, materials, acts, and equivalents of all means or step plus function elements in the claims below are intended to include any structure, material, or act for performing the function in combination with other claimed elements as specifically claimed.

At least one aspect of the present invention may provide a beneficial effect such as, for example, controlling the activities of a system administrator or another user on an endpoint device.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for controlling access on an endpoint device to at least a portion of an application, the method comprising the steps of:
    obtaining a default user interface for said application with one or more widget functions associated with said application enabled;
    generating a mask user interface to update said default user interface using an additional control layer between a user of said application and said default user interface by comparing said one or more widget functions to a privilege configuration for said access, wherein said privilege configuration comprises a specification of one or more of said widget functions that have a disabled status for a particular user role;
    combining said default user interface and said mask user interface substantially simultaneously with said access to generate a final user interface such that one or more of the widget functions from said default user interface are modified to a disabled status in said final user interface based on said privilege configuration;
    determining, by an event filter, if one or more user click events generated using said final user interface are associated with a widget function having said disabled status; and
    preventing, by said event filter, said user click events having said disabled status from being provided to an operating system for further processing, wherein at least one of said steps is carried out by a computing device.

2. The method of claim 1, wherein said privilege configuration maps one or more of widget functions to roles, tasks to roles, widget functions to endpoints and tasks to times-of-day.

3. The method of claim 1, wherein said one or more widget functions having said disabled status has a visual indicator illustrating said disabled status.

4. The method of claim 3, wherein said visual indicator comprises presenting said one or more widget functions having said disabled status with a predefined color or with a semi-transparent display technique.

5. The method of claim 1, wherein said privilege configuration further comprises a specification of one or more of said widget functions having said disabled status for one or more of: a period of time, for a particular user, for a particular task, for accessing a particular file and for loading of a particular application.

6. The method of claim 1, wherein said privilege configuration is based on one or more of (i) a policy that maps one or more of said widget functions to one or more user roles; and (ii) one or more policies that map a given role to one or more tasks and map a given task to one or more of said widget functions.

7. A computer program product for controlling access on an endpoint device to at least a portion of an application, the computer program product comprising a computer readable storage medium having program instructions embodied therewith, the program instructions executable by a computing device to cause the computing device to perform the following steps:
    obtaining a default user interface for said application with one or more widget functions associated with said application enabled;
    generating a mask user interface to update said default user interface using an additional control layer between a user of said application and said default user interface by comparing said one or more widget functions to a privilege configuration for said access wherein said privilege configuration comprises a specification of one or more of said widget functions that have a disabled status for a particular user role;
    combining said default user interface and said mask user interface substantially simultaneously with said access to generate a final user interface such that one or more of the widget functions from said default user interface are modified to a disabled status in said final user interface based on said privilege configuration;
    determining, by an event filter, if one or more user click events generated using said final user interface are associated with a widget function having said disabled status; and
    preventing, by said event filter, said user click events having said disabled status from being provided to an operating system for further processing, wherein at least one of said steps is carried out by a computing device.

8. The computer program product of claim 7, wherein said privilege configuration maps one or more of widget functions to roles, tasks to roles, widget functions to endpoints and tasks to times-of-day.

9. The computer program product of claim 7, wherein said one or more widget functions having said disabled status is presented with one or more of a predefined color and a semi-transparent display technique.

10. The computer program product of claim 7, wherein said one or more widget functions having said disabled status is disabled for one or more of a period of time, for a particular user, for a particular task, for accessing a particular file and for loading of a particular application.

11. The computer program product of claim 7, wherein said privilege configuration is based on one or more of (i) a policy that maps one or more of said widget functions to one or more user roles; and (ii) one or more policies that map a given role to one or more tasks and map a given task to one or more of said widget functions.

12. A system for controlling access on an endpoint device to at least a portion of an application, said system comprising:

a memory; and at least one hardware device coupled to the memory and configured for:

obtaining a default user interface for said application with one or more widget functions associated with said application enabled;

generating a mask user interface to update said default user interface using an additional control layer between a user of said application and said default user interface by comparing said one or more widget functions to a privilege configuration for said access, wherein said privilege configuration comprises a specification of one or more of said widget functions that have a disabled status for a particular user role;

combining said default user interface and said mask user interface substantially simultaneously with said access to generate a final user interface such that one or more of the widget functions from said default user interface are modified to a disabled status in said final user interface based on said privilege configuration;

determining, by an event filter, if one or more user click events generated using said final user interface are associated with a widget function having said disabled status; and preventing, by said event filter, said user click events having said disabled status from being provided to an operating system for further processing, wherein at least one of said steps is carried out by a computing device.

13. The system of claim 12, wherein said privilege configuration maps one or more of widget functions to roles, tasks to roles, widget functions to endpoints and tasks to times-of-day.

14. The system of claim 12, wherein said one or more widget functions having said disabled status has a visual indicator illustrating said disabled status.

15. The system of claim 14, wherein said visual indicator comprises presenting said one or more widget functions having said disabled status with a predefined color or with a semi-transparent display technique.

16. The system of claim 12, wherein said privilege configuration further comprises a specification of one or more of said widget functions having said disabled status for one or more of: a period of time, for a particular user, for a particular task, for accessing a particular file and for loading of a particular application.

17. The system of claim 12, wherein said privilege configuration is based on one or more of (i) a policy that maps one or more of said widget functions to one or more user roles; and (ii) one or more policies that map a given role to one or more tasks and map a given task to one or more of said widget functions.

* * * * *